United States Patent
Rizvi et al.

(10) Patent No.: US 10,040,940 B2
(45) Date of Patent: Aug. 7, 2018

(54) BONE GLUE MODIFIED ASPHALT

(71) Applicant: University of Louisiana at Lafayette, Lafayette, LA (US)

(72) Inventors: Hashim Raza Rizvi, Lafayette, LA (US); Mohammad Jamal Khattak, Lafayette, LA (US)

(73) Assignee: University of Louisiana at Lafayette, Lafayette, LA (US)

( * ) Notice: Subject to any disclaimer, the term of this patent is extended or adjusted under 35 U.S.C. 154(b) by 0 days.

(21) Appl. No.: 15/278,140

(22) Filed: Sep. 28, 2016

(65) Prior Publication Data

US 2017/0088711 A1 Mar. 30, 2017

Related U.S. Application Data

(60) Provisional application No. 62/233,563, filed on Sep. 28, 2015.

(51) Int. Cl.
*C08L 95/00* (2006.01)
*C08L 89/04* (2006.01)

(52) U.S. Cl.
CPC ............. *C08L 95/00* (2013.01); *C08L 89/04* (2013.01); *C08L 2555/82* (2013.01)

(58) Field of Classification Search
CPC .......... C08L 95/00; C08L 89/00; C08L 89/04; C08L 89/06; C08L 2555/82; C09D 189/06; C09J 189/06; C09J 11/00
See application file for complete search history.

(56) References Cited

U.S. PATENT DOCUMENTS

| | | | | |
|---|---|---|---|---|
| 1,440,356 A * | 12/1922 | Morrell | ............... | B01F 17/0085 44/301 |
| 4,331,547 A * | 5/1982 | Stotts | ............... | C04B 38/106 106/122 |
| 5,210,982 A * | 5/1993 | Kormanek | ............... | B24D 3/34 106/205.6 |
| 8,133,316 B2 * | 3/2012 | Poncelet | ............... | C08L 95/00 106/273.1 |
| 8,900,360 B2 * | 12/2014 | Nevin | ............... | C08L 95/00 106/281.1 |

OTHER PUBLICATIONS

"Superpave Performance Grading" Oct. 8, 2008. http://www.pavementinteractive.org <http://www.pavementinteractive.org/article/superpave-performance-grading/> Accessed Aug. 9, 2016.*
Hashim Raza Rizvi, Mohammad Jamal Khattak, and August A. Gallo, "Bone Glue Modified Asphalt: A Step towards Energy Conservation and Environment Friendly Modified Asphalts," International Scholarly Research Notices, vol. 2014, Article ID 807043, 5 pages, 2014. doi:10.1155/2014/807043.*

* cited by examiner

*Primary Examiner* — Jennifer A Smith
*Assistant Examiner* — Alexandra M Moore
(74) *Attorney, Agent, or Firm* — Lauren J. Rucinski; Russel O. Primeaux; Kean Miller LLP

(57) ABSTRACT

The disclosed invention is a method for using collagen extracted from animal bones, hides, and flesh waste as a protein-based glue (Bone Glue) to create asphalt with a modified asphalt binder. The method comprises of mixing Bone Glue with water, adding it to an asphalt binder, evaporating the water, adding the modified binder to aggregate and mixing at an elevated temperature. The modified asphalt binder consists of a predetermined amount of Bone Glue and asphalt binder.

14 Claims, 20 Drawing Sheets

| Binder type | Mixing temperature (°C) | Compaction temperature (°C) |
|---|---|---|
| AC5 neat | 144–147 | 136–140 |
| AC5-10% BG | 149–154 | 140–146 |
| PAC30 | 170–175 | 157–162 |
| PAC30-10% BG | 172–178 | 159–164 |

Mixing and compaction temperatures of AC5 and PAC30 binder modified with 10% Bone Glue (BG).

| BG dosage (%) | 2.5 | 5 | 7.5 | 10 | 20 |
|---|---|---|---|---|---|
| Time (min) | 30 | 40 | 50 | 60 | 80 |
| Temperature (°C) | 130 | 130 | 130 | 130 | 130 |

Figure 1: Mixing time and temperature.

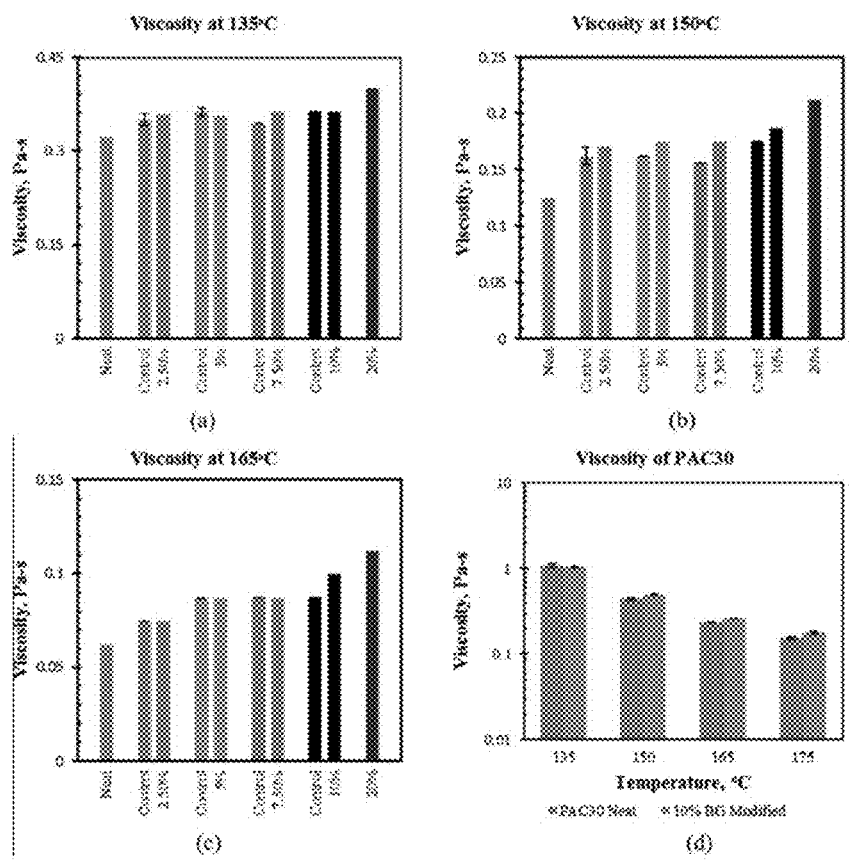
Fig. 2 Viscosity comparison of AC5 and BG modified binders at (a) 135°C (b) 150°C (c) 165°C and (d) viscosity comparison of PAC30 neat and 10%BG modified binders.

| Binder type | Mixing temperature (°C) | Compaction temperature (°C) |
| --- | --- | --- |
| AC5 neat | 144–147 | 136–140 |
| AC5-10% BG | 149–154 | 140–146 |
| PAC30 | 170–175 | 157–162 |
| PAC30-10% BG | 172–178 | 159–164 |

Figure 3. Mixing and compaction temperatures of AC5 and PAC30 binder modified with 10% Bone Glue (BG).

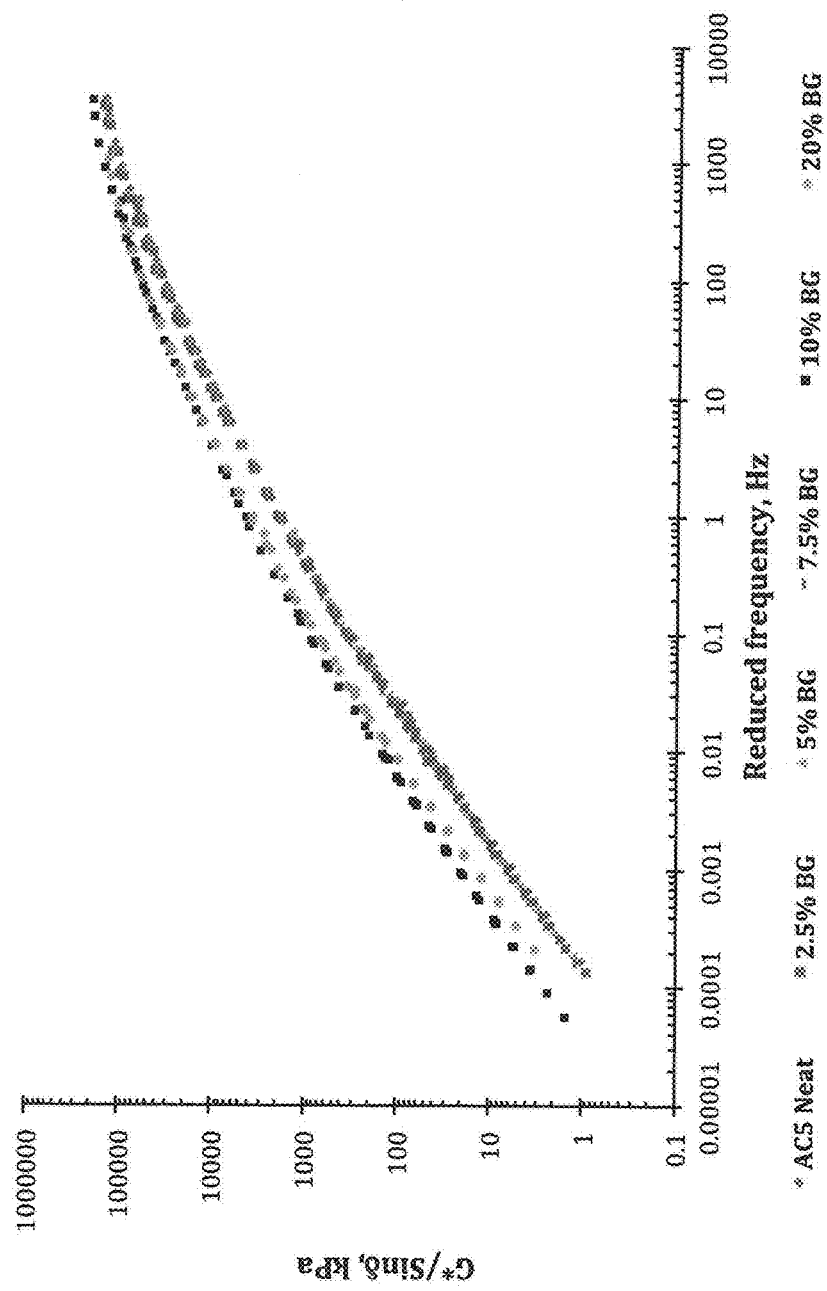
FIGURE 4 Master curves of AC5 neat and BG modified AC5 binders at 15°C

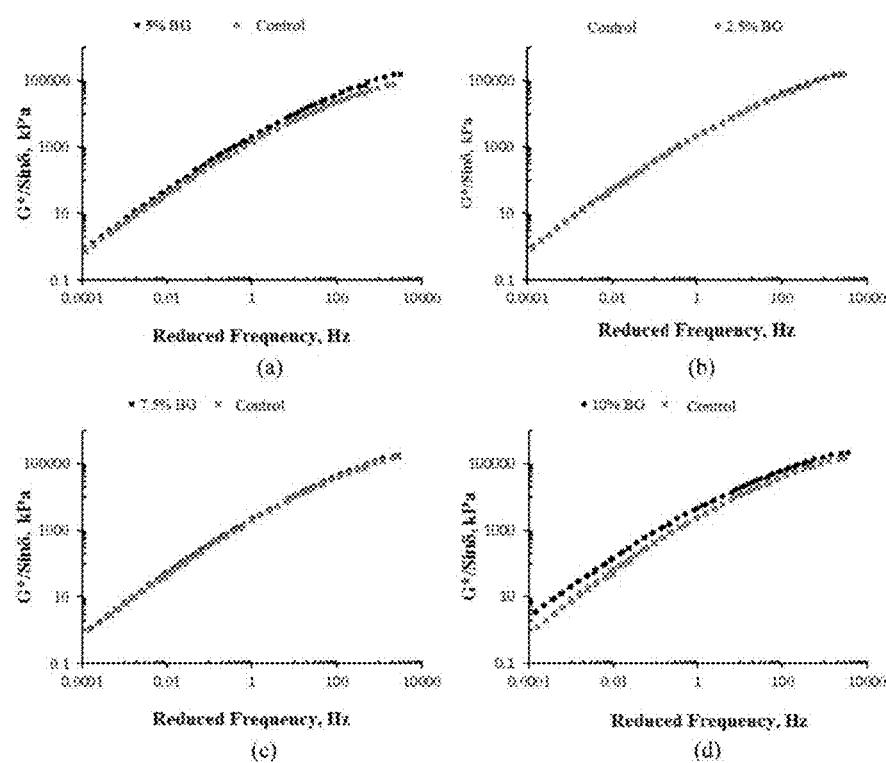
Figure 5. Master curves for control and BG modified binders (a) 5% BG Binder, (b) 2.5% BG binder, (c) 7.5% BG binder, and (d) 10% BG binder.

| Frequency (Hz) (1) | % Increase of 10% BG relative to AC5 neat (2) | % Improvement of 10% BG relative to control binder (3) | % Increase due to short-term aging during mixing (2-3) |
| --- | --- | --- | --- |
| 1000 | 49 | 33 | 16 |
| 100 | 74 | 39 | 35 |
| 10 | 102 | 69 | 33 |
| 1.58 | 132 | 85 | 47 |
| 1 | 144 | 91 | 53 |
| 0.01 | 193 | 138 | 55 |
| 0.001 | 240 | 164 | 76 |

Figure 6. Comparison of $(\frac{G^*}{\sin \delta})$, values of AC5 neat, control and AC5 modified with 10% BG.

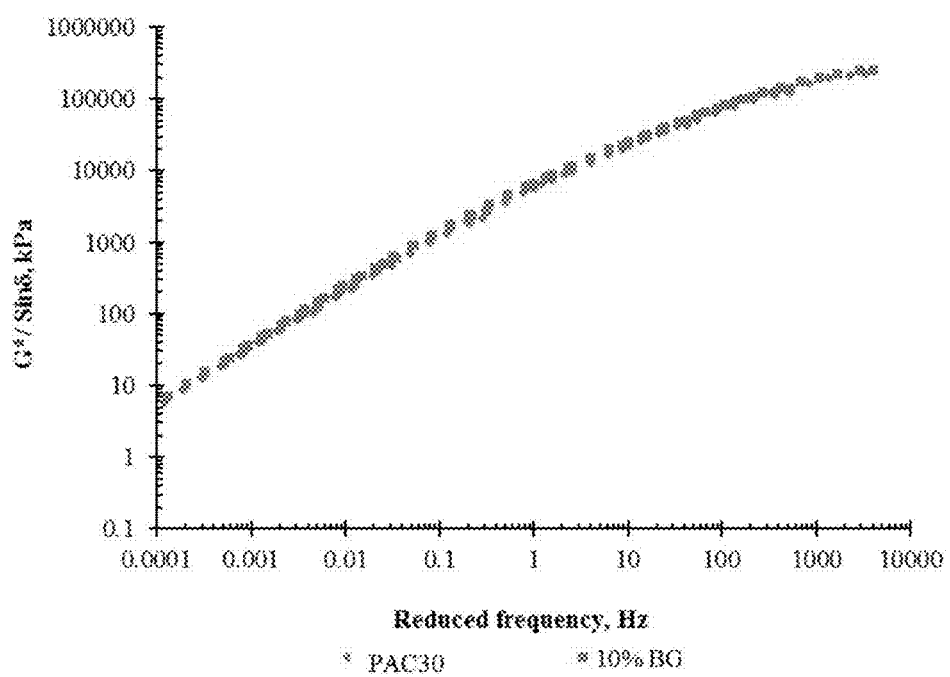
Figure 7. Master curves of PAC30 neat and 10% BG modified PAC30 binders.

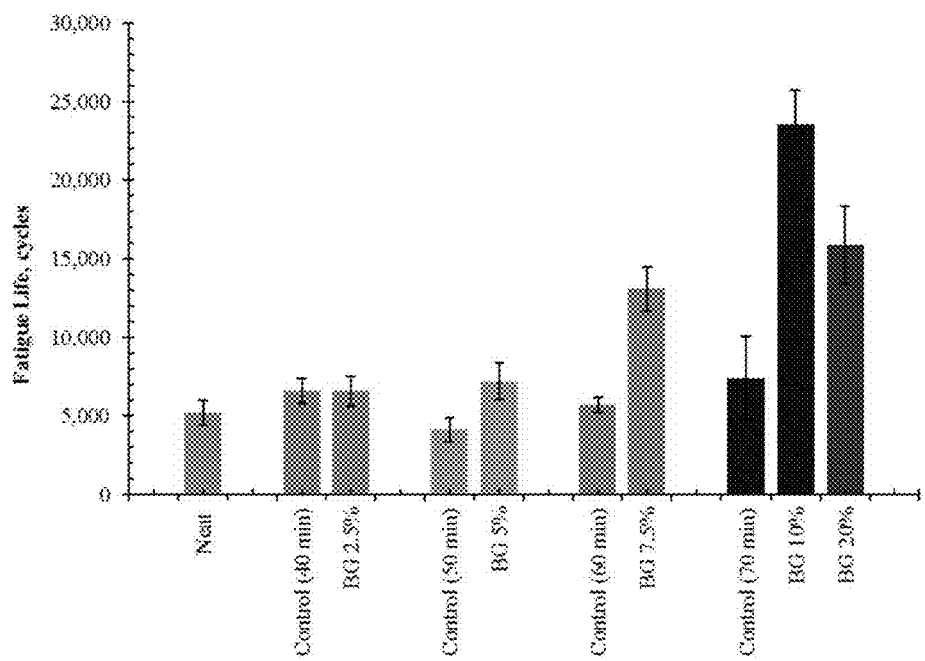
Figure 8. Fatigue life of AC5 neat, control and BG modified binders.

| Binder type | Fatigue life | Standard deviation | % Difference |
|---|---|---|---|
| AC5 neat | 5190 | 805 | |
| AC5 control (40 min) | 6605 | 818 | -0.16 |
| AC5 BG 2.5% | 6565 | 987 | |
| AC5 control (50 min) | 4102 | 771 | 76 |
| AC5 BG 5% | 7227 | 1186 | |
| AC5 control (60 min) | 5699 | 526 | 129 |
| AC5 BG 7.5% | 13,054 | 1404 | 76 |
| AC5 control (70 min) | 7396 | 2662 | 218 |
| AC5 BG 10% | 23,528 | 2203 | |
| AC5 20% | 15,849 | 2459 | 114 |
| PAC 30 | 84,064 | 5656 | 107 |
| PAC 30 10% BG | 174,266 | 12,003 | |

Figure 9. Summary of fatigue life of neat, control, and BG modified binders.

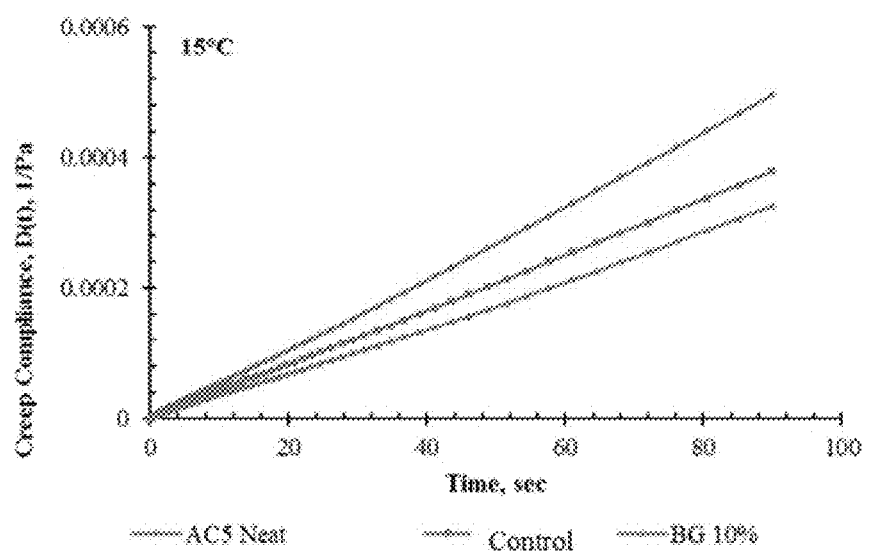
Figure 10. Creep compliance of AC5 neat, control and 10% BG modified binders at 15°C.

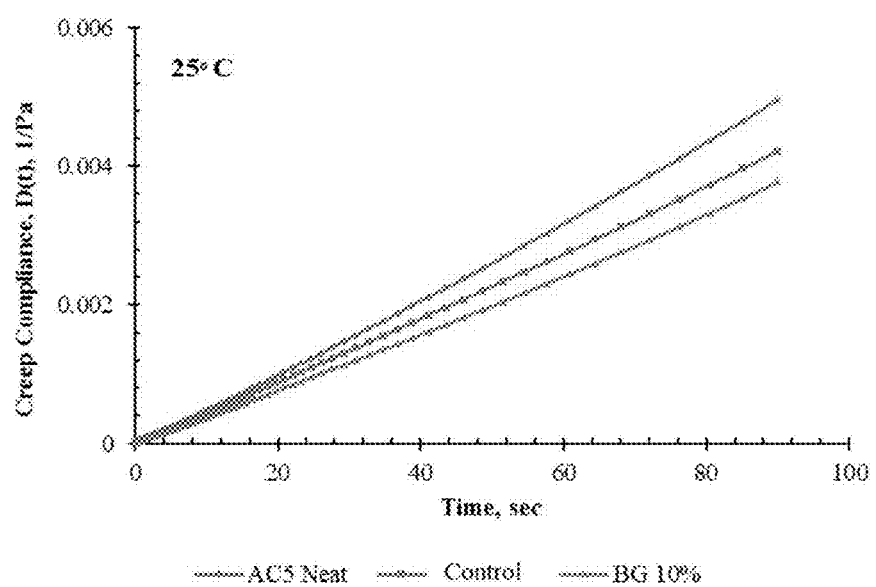
Figure 11. Creep compliance of AC5 neat, control and 10% BG modified binders at 25°C.

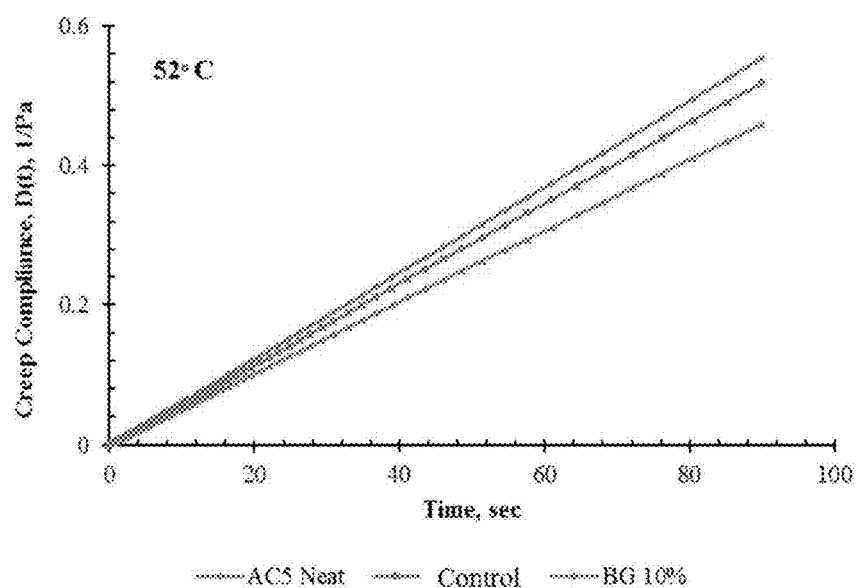
Figure 12. Creep compliance of AC5 neat, control and 10% BG modified binders at 52°C

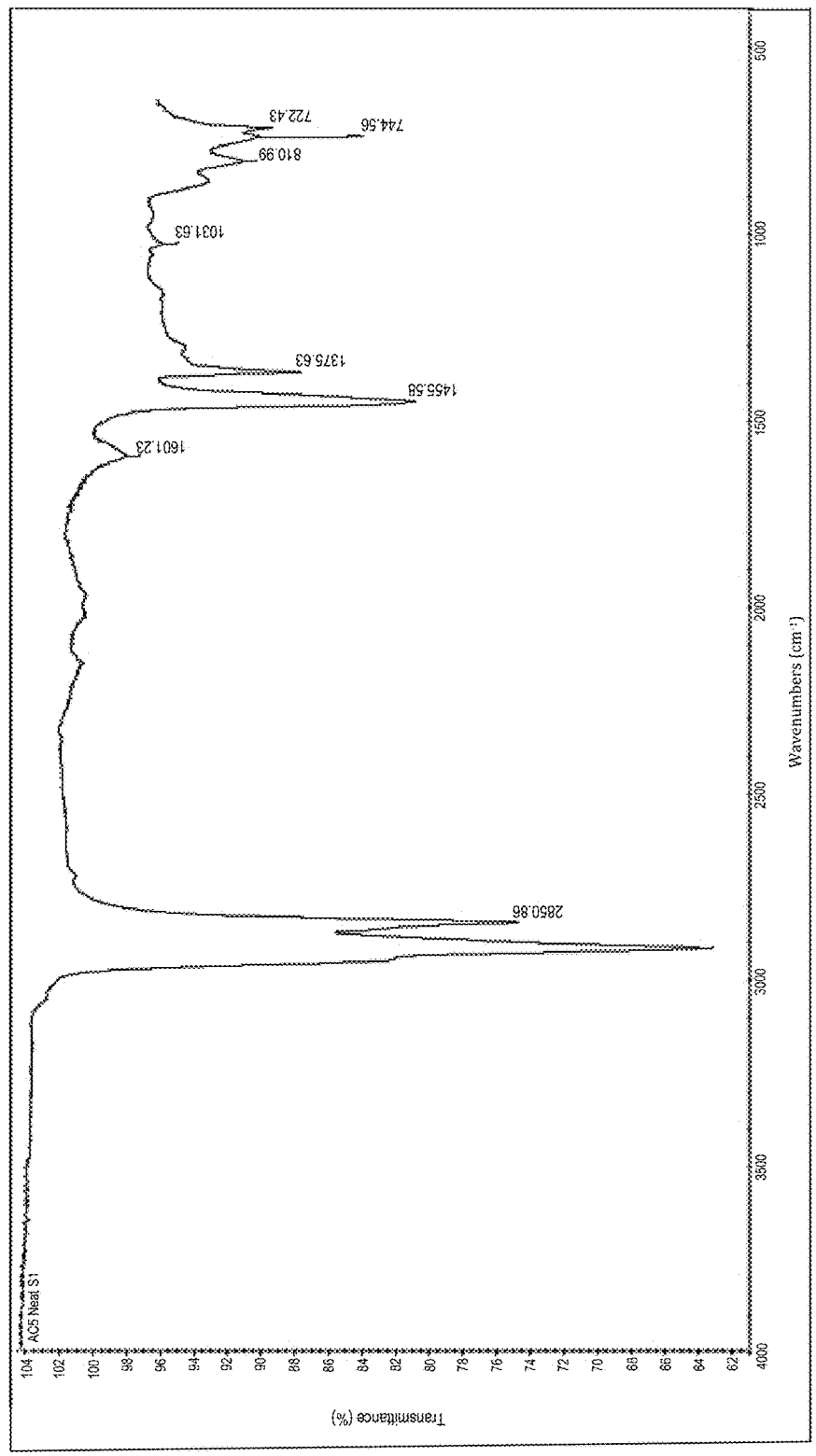
Figure 13. AC5 neat asphalt spectroscopy

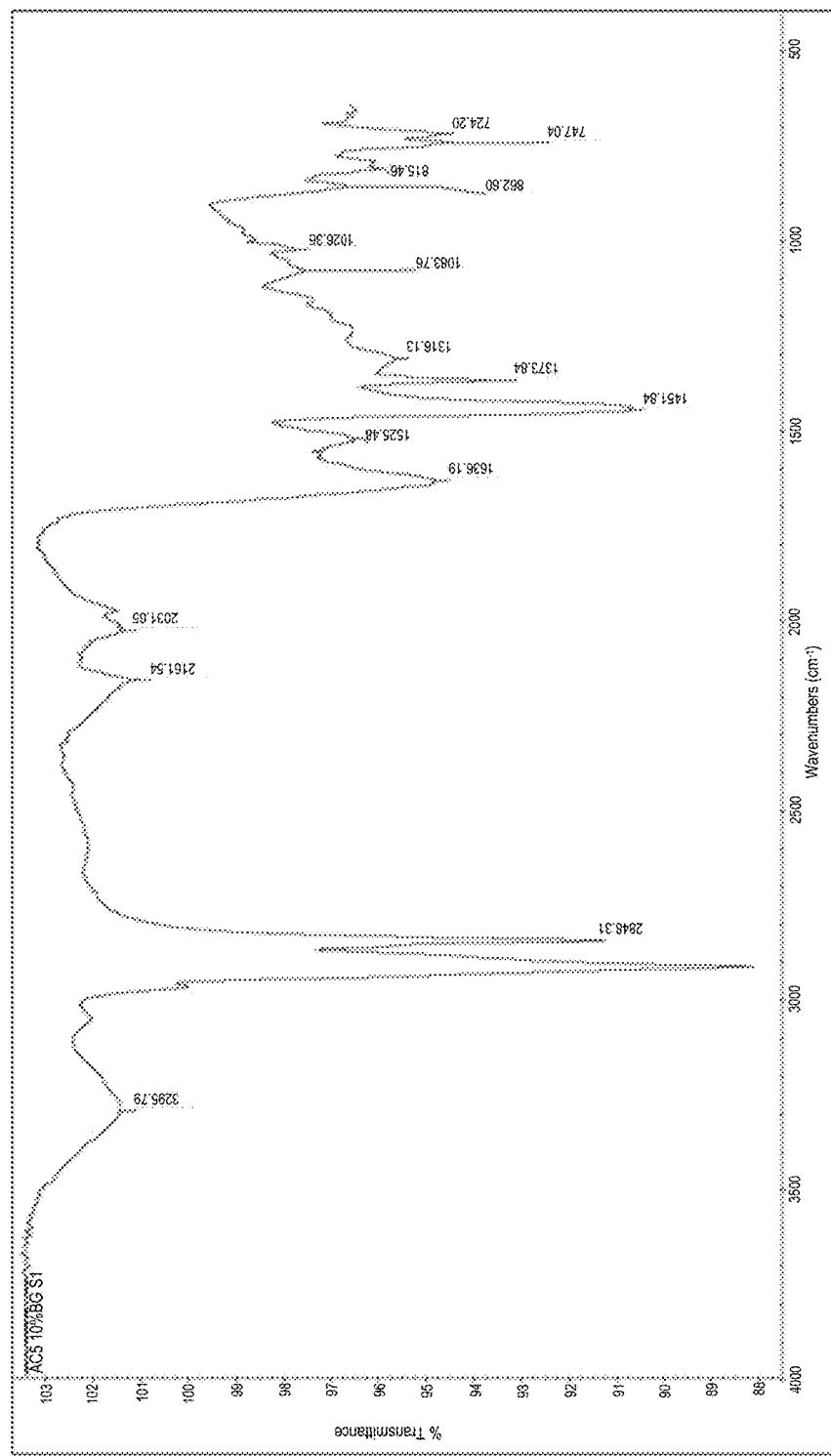
Figure 14. AC5 modified with 10% BG spectroscopy

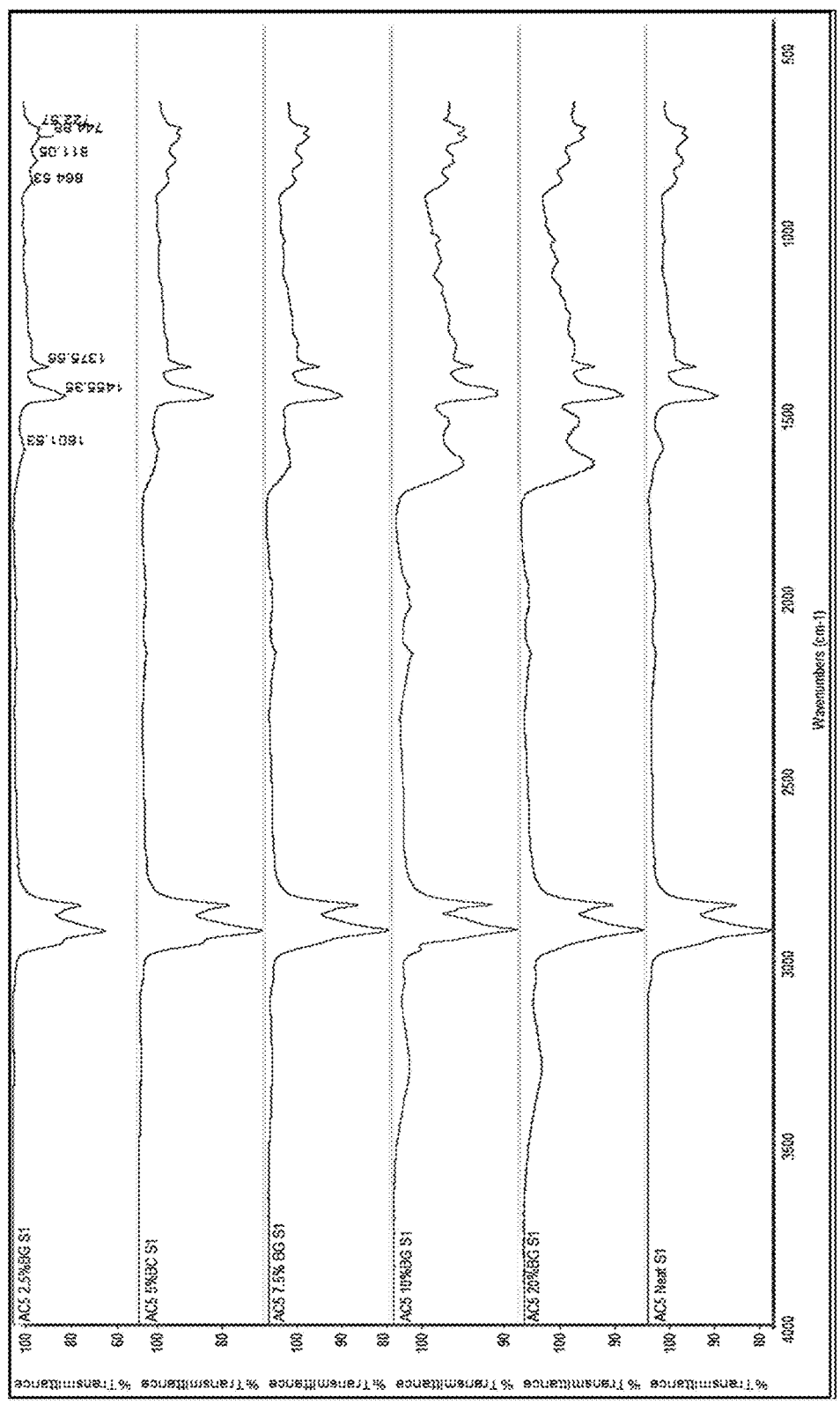
Figure 15. Comparison of AC5 neat, 2.5%, 5%, 7.5%, 10% and 20% BG modifiers binders.

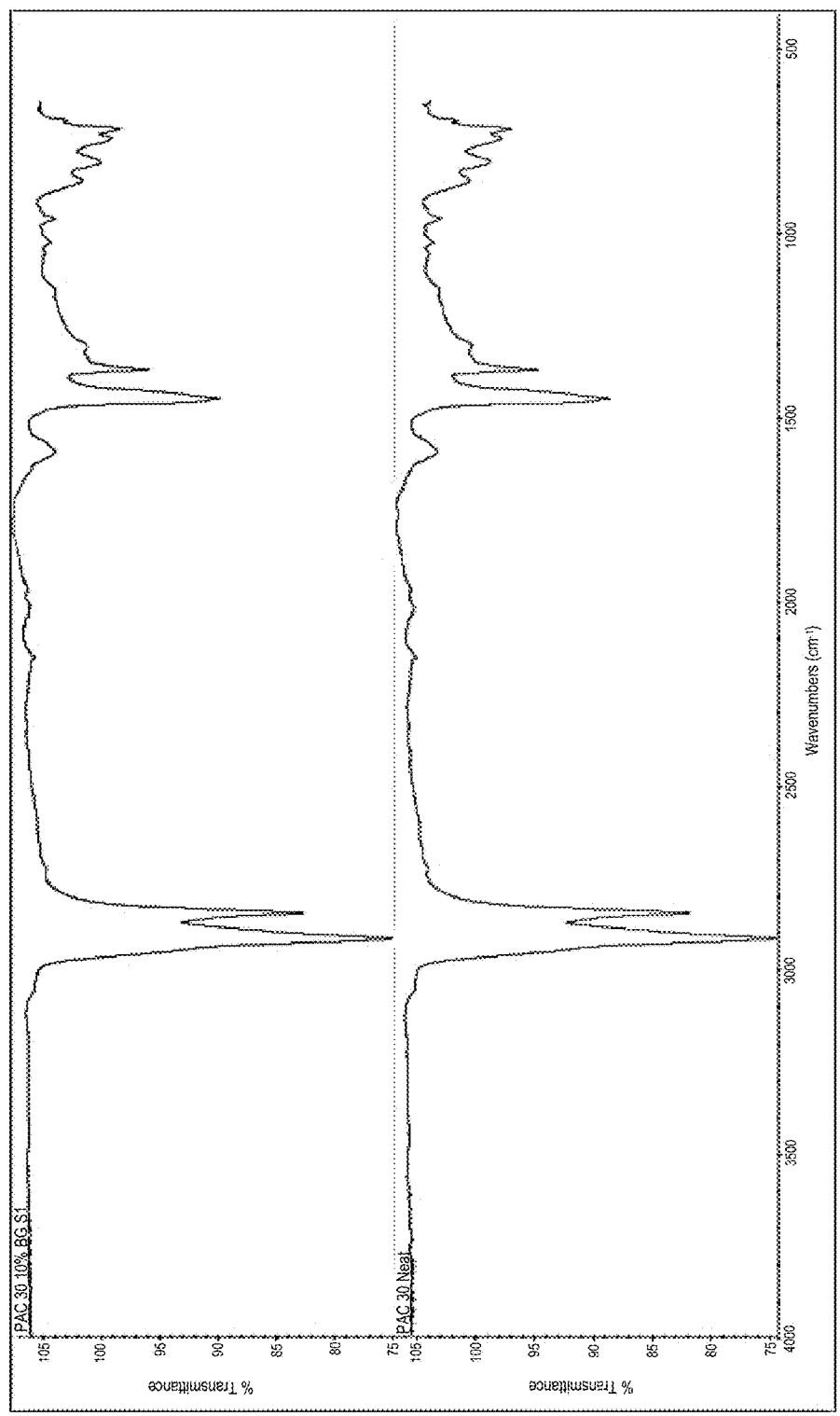
Figure 16. PAC30 and PAC30 with 10% BG binder spectroscopy.

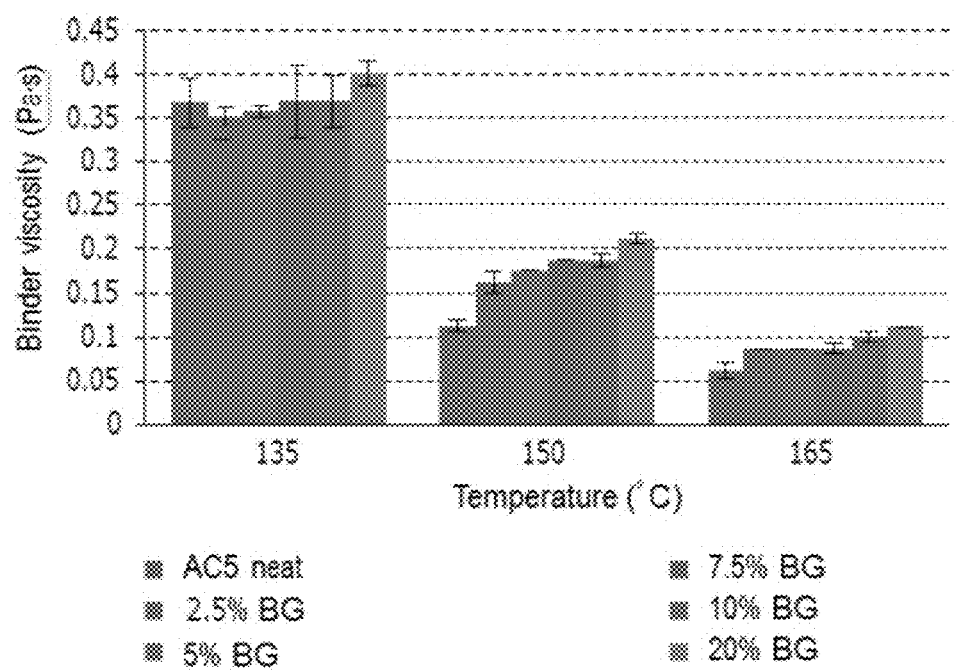
Figure 17: Viscosity of neat and BG-modified AC5 at various temperatures.

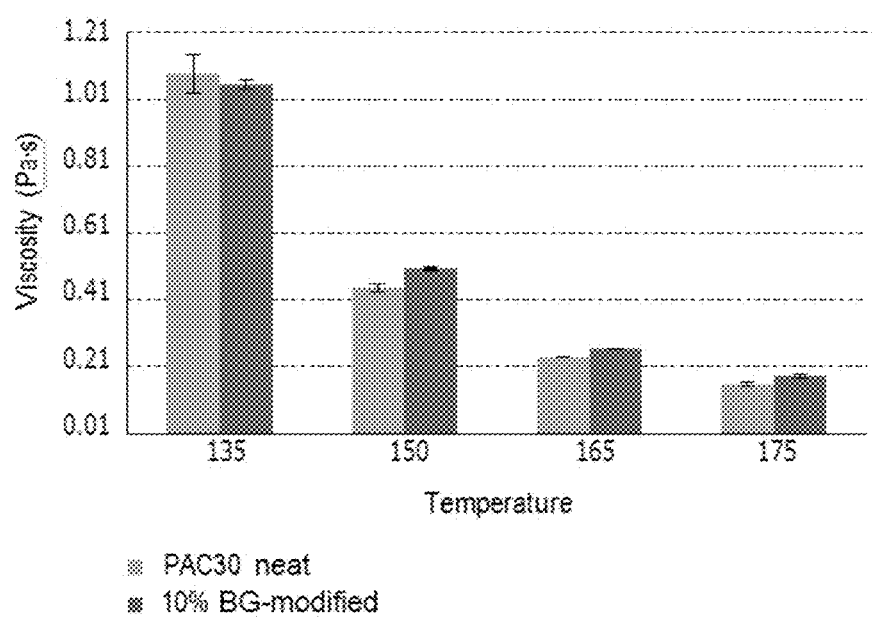
Figure 18: Viscosities of PAC30 and 10% BG-modified PAC30 at various temperatures.

| AC5 N and BG binder G* at 1.57 Hz | | | | | |
|---|---|---|---|---|---|
| Temperature | AC5 N | 5% BG | 10% BG | 20% BG | Diff. |
| 1°C | 3.4e7 | 3.5e7 | 5.9e7 | 3.1e7 | 74% |
| 58°C | 1.6e3 | 2.0e3 | 2.3e3 | 2.3e3 | 38% |

| PAC30 neat and BG at 1.57 Hz | | | |
|---|---|---|---|
| Temperature | PAC N | 10% BG | Diff. |
| 1°C | 6.54e7 | 8.1e7 | 25% |
| 58°C | 5.8e3 | 7.02e7 | 21% |

Figure 19: Comparison of G* at 1 degree and 58 degrees.

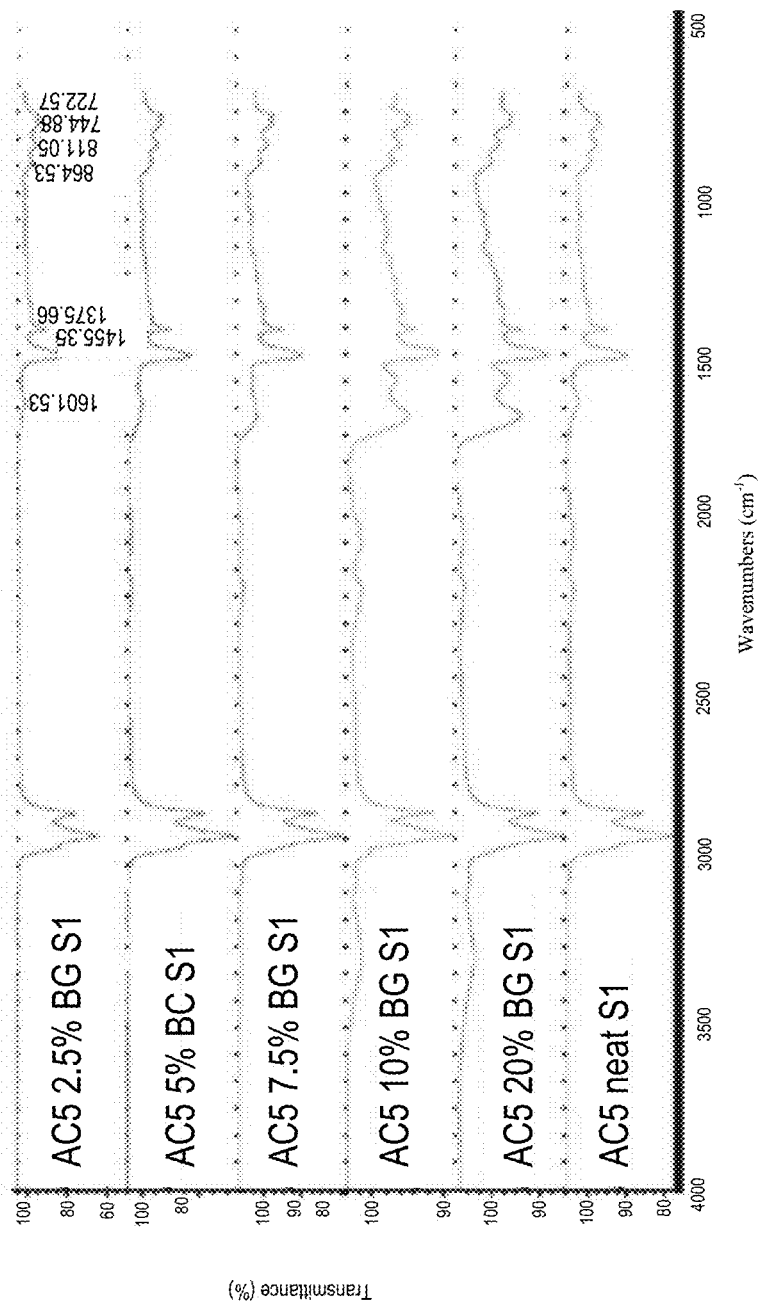
Figure 20. IR Spectroscopy of neat and modified binders.

BONE GLUE MODIFIED ASPHALT

CROSS REFERENCE TO RELATED APPLICATIONS

This application claims priority to the U.S. Provisional Patent No. 62/233,563 entitled "Bone Glue Modified Asphalt," filed Sep. 28, 2015.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the Bone Glue Modified Asphalt, which may be embodied in various forms. It is to be understood that in some instances, various aspects of the invention may be shown exaggerated or enlarged to facilitate an understanding of the invention. Therefore the drawings may not be to scale.

FIG. 1 is a table showing the required mixing times for the Bone Glue-binder mixture as they vary with different Bone Glue content percentages.

FIG. 2 is the viscosity comparison of AC5 neat and Bone Glue modified binders at (a) 135° C., (b) 150° C., (c) 165° C., and (d) is the viscosity comparison of PAC30 neat and 10% Bone Glue modified binders. The results show that Bone Glue does not significantly increase the viscosity of asphalt. This is important because the modified binder needs to remain sufficiently flue for pumping and mixing.

FIG. 3 is a table that shows the mixing and compaction temperature ranges for HMA with and without Bone Glue modified binders. These increases in mixing and compaction temperature are relatively insignificant when compared to polymer modification. Lower mixing and compaction temperatures decrease the energy consumption during HMA processing.

FIG. 4 shows the master curves of AC5 neat and Bone Glue modified AC5 binders at 15° C. It demonstrates that a 10% Bone Glue modified binder exhibits significant improvements at all frequencies and especially at lower frequencies or higher temperatures. It also demonstrates that a 10% Bone Glue content is the optimal content for asphalt modification.

FIG. 5 shows the master curves for control and Bone Glue modified binders (a) 5% Bone Glue Binder, (b) 2.5% Bone Glue binder, (c) 7.5% Bone Glue binder, and (d) 10% Bone Glue binder. The figure indicates that a 10% Bone Glue content modified binder exhibits improvements at all frequencies and especially at lower frequencies relative to the control binders.

FIG. 6 is a table that demonstrates the percentage improvements in $$\left(\frac{G^*}{\sin \delta}\right)$$

or the complex shear modulus elastic portion, of binders with a 10% Bone Glue content for various frequency levels. The table indicates that a 10% Bone Glue content modified binder exhibits significant improvements at all frequencies and especially at lower frequencies relative to the control binders. $G^*$ and $\delta$ are used as predictors of HMA rutting and fatigue cracking. Thus an improvement in these characteristics improves the rutting and fatigue cracking the pavement.

FIG. 7 shows the master curves of PAC30 neat and 10% Bone Glue modified PAC30 binders. It demonstrates improvements in $$\left(\frac{G^*}{\sin \delta}\right)$$

or the complex shear modulus elastic portion by 20-27% for a 10% Bone Glue content modified PAC30. The improvement is substantially lower than the improvement shown by the Bone Glue modified AC5, but the PAC30 binder is already modified by the SBS polymer.

FIG. 8 shows is the fatigue life of AC5 neat, control and Bone Glue modified binders. It demonstrates that the fatigue life increases with an increase in Bone Glue content and exhibits an optimum value at 10% Bone Glue content. The improvements in fatigue life for that content is 3.5 times the AC 5 neat binder.

FIG. 9 is a table that summarizes the fatigue life of neat, control, and Bone Glue modified binders. Improvement in fatigue life helps the pavement in its resistance against fatigue cracking. The improvement in fatigue life of 10% Bone Glue modified binder relative to the control is 218%. The PAC30 modified with 10% Bone Glue content showed significant improvement in fatigue life as well. The table shows improvements of up to 107% for PAC 30 modified. This result indicates that polymer modified asphalts can further be enhanced with Bone Glue without compromising the mixing and compaction temperatures.

FIG. 10 shows the creep compliance of AC5 neat, control and 10% Bone Glue modified binders at 15° C. The creep compliance of 10% Bone Glue modified binder is less than the neat and control binders. This improvement will allow the binder to resist rutting at moderate to high temperatures.

FIG. 11 is Creep compliance of AC5 neat, control and 10% Bone Glue modified binders at 25° C. The creep compliance of 10% Bone Glue modified binder is less than the neat and control binders. This improvement will allow the binder to resist rutting at moderate to high temperatures.

FIG. 12 is Creep compliance of AC5 neat, control and 10% Bone Glue modified binders at 52° C. The creep compliance of 10% Bone Glue modified binder is less than the neat and control binders. This improvement will allow the binder to resist rutting at moderate to high temperatures.

FIG. 13 is AC5 neat asphalt spectroscopy. Chemical bonds in different environments will absorb varying intensities and at varying frequencies. IR spectroscopy involves collecting infrared radiation absorption information and analyzing it in the form of a spectrum. The frequencies at which there are absorptions of IR radiation can be correlated directly to bonds within the compound. Thus the IR spectrum of Bone Glue modified binders should ideally have the same peaks and valleys as non-Bone Glue modified binders. The IR spectrum also indicates the homogeneity of the binders.

FIG. 14 is AC5 modified with 10% Bone Glue spectroscopy. The 10% Bone Glue modified AC5 has similar peaks as the AC5 neat spectrum.

FIG. 15 is Comparison of AC5 neat, 2.5%, 5%, 7.5%, 10% and 20% Bone Glue modifiers binders. When the amount of Bone Glue is increased in the binder, the water content also increases and this is observable in the IR spectrum. However, all other observable peaks in the IR spectrum appear to be unchanged.

FIG. 16 is PAC30 and PAC30 with 10% Bone Glue binder spectroscopy. PAC30 exhibits identical spectroscopy for both the neat and 10% Bone Glue modified binders. This means that the mixing procedure is homogenous and no traces of solvent were found in the spectroscopy.

FIG. 17 shows the viscosity of neat AC5 as compared to Bone Glue modified AC5 at various temperatures. Viscosity is a key characteristic of asphalt binders. The figure demonstrates that there is no significant change in viscosity between the AC5 neat and AC5 modified.

FIG. 18 shows the viscosity of PAC 30 and 10% Bone Glue modified PAC 30 at various temperatures. Like AC 5, there is no significant change in viscosity between the PAC 30 neat and PAC 30 Bone Glue modified.

FIG. 19 is a table that compares $$\left(\frac{G^*}{\sin\delta}\right)$$

or the complex shear modulus elastic portion for varying embodiments. G* is the complex shear modulus or total resistance to deformation when repeatedly sheared. δ is the phase angle or the lag between the applied shear stress and resulting shear strain. G* and δ are used as predictors of HMA rutting and fatigue cracking. To resist rutting, an asphalt binder should be stiff and elastic. Thus the complex shear modulus elastic portion, $$\left(\frac{G^*}{\sin\delta}\right),$$

should be large. The table indicates that the preferred embodiment contains 10% Bone Glue because of the peak in complex shear modulus.

FIG. 20 is the IR spectroscopy of neat and modified binders. Chemical bonds in different environments will absorb varying intensities of radiation at varying frequencies. IR spectroscopy involves collecting infrared radiation absorption information and analyzing it in the form of a spectrum. The frequencies at which there are absorptions of IR radiation can be correlated directly to bonds within the compound. Thus the IR spectrum of Bone Glue modified binders should ideally have the same peaks and valleys as non-Bone Glue modified binders. The IR spectrum also demonstrates the presence of water and signals whether or a longer reaction and evaporation time is warranted to remove any excess water from the modified binder mixture.

DETAILED DESCRIPTION

The described features, advantage, and characteristics may be combined in any suitable manner in one or more embodiments. One skilled in the relevant art will recognize that the varying components of this method and resulting composition may be practiced without one or more of the specific features or advantages of the particular embodiment. In other instances, additional features and advantages may be recognized in certain embodiments that may not be present in all embodiments.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided, such as examples of asphalt binders, mixers, and raw biomaterials. One skilled in the relevant art will recognize, however, that the Bone Glue Modified Asphalt may be practiced without one or more of the specific details, or with other methods, components, materials, and so forth. In other instances, well-known structures, materials, or operations are not shown or described in detail to avoid obscuring aspects of the invention.

Described herein, is a novel asphalt production technique which creates a new type of material, animal protein-based bone glue modified asphalt binder. The biomaterial glue comprises collagen from animal byproducts as an asphalt binder modifier and the resulting modified asphalt binder is mixed with at least one aggregate to form asphalt.

As used herein, "asphalt binder" refers to a binder that is to be added to an aggregate to create asphalt and "asphalt" refers to the resulting composition when an asphalt binder and an aggregate are combined under heated conditions.

Asphalt binder modification has proven advantages over the lifetime of pavement. Polymer-modified asphalt binder has been shown to evidence greater elastic recovery, a higher softening point, greater viscosity, greater cohesive strength, and greater ductility. Furthermore, polymer modification can improve structural and engineering properties of the asphalt binder including improvements in the rheological characteristics of the binder and the aggregate-adhesion capabilities.

A variety of polymers are used as asphalt binder modifiers. Some of the more commonly used polymers include: SBS (styrene-butadiene-styrene), SBR (styrene-butadiene-rubber), Elvaloy rubber, EVA (ethylene-vinyle acetate), HDP (high density polyethylene), LDP (low density polyethylene), and tire rubber.

Although asphalt binder modification with synthetic and natural polymers has been a common practice in developed countries, the extensive amount of energy consumed during the modification process and the relatively high prices of polymers has limited its use in developing countries. The polymer-asphalt binder blending process requires high temperatures (150° F. to 375° F.) and an extended period of time (60 to 200 min) Furthermore, the most commonly used asphalt binder modifier, SBS, increased in price dramatically since 2008 because of a shortage in its raw material, ethylene. Alternatives to SBS include GTR (ground tire rubber), SBR-latex, EVA (ethyle vinyl acitate), and PPA (polyphosphoric acid). The mixing process for GTG requires high temperatures (340 to 410° F.), difficult shear mixing conditions, and costly chemical stabilizers. SBR-latex is not storage stable, EVA is only used in warm climates, and PPA is merely an extender, not an actual alternative.

Bone Glue is a protein-based glue made from collagen extracted from animal bones, hides, and flesh waste. Collagen is a group of naturally occurring proteins and is the most abundant protein making up 25% to 35% of the entire bodily protein content of animals. Collagen I is the main type of collagen and accounts for 90% of the total collagen present in the body. Therefore, Bone Glue is readily accessible in developing countries unlike the costly polymers described above. Even in developed countries, the price of Bone Glue is as low as 50% of the present cost of other polymers.

Bone Glue is manufactured from the bone-waste of animals. This type of protein-based glue can also be manufactured using skin or hide waste as the raw material. Major sources of this waste include slaughter houses and domestic daily waste. Average solid waste generation from a bovine slaughter house is 275 kg/ton of total live weight killed (TLWK) which is equivalent to 27.5% of the animal weight. Goat and sheep slaughter houses produce 2.3 kg/head or 4% of the animal's weight. The specific weight index (mass of accumulated waste divided by mass of saleable product) for the most common animal sources of Bone Glue are: Cows 0.56, Pigs 0.2, Calf 0.87 and Sheep 0.1.

With only minor variations, the same basic processes are used to make both Bone Glue and hide or skin glue. For hide or skin glue, the hides or skins are washed to remove dirt and soaked. Then the material is bathed in lime to break down the hides or skins and rinsed and soaked in a weak acid to remove the lime Finally, the material is boiled in open tanks. The cooled product is processed to remove impurities and ready to be used. For Bone Glue, the bones must be degreased with solvents and hydrochloric acid in an 8% solution to remove the calcium phosphate and other minerals. Then the acid is removed from the collagen and the resulting product is dried to produce commercial-grade ossein, also known as bone protein or acidulated bone, which is used as the raw material for Bone Glue. The bone protein is then processed through a boiling tank and cooled as described above. The final product is what is known as Bone Glue.

The economics and availability of Bone Glue make it a more accessible asphalt binder modifier, and the use of Bone Glue in the pavement industries eliminates hazardous organic waste from the environment.

Hot Mixed Asphalt (HMA) is a mixture of asphalt binder and graded mineral aggregate (generally 95% aggregate and 5% binder) mixed at an elevated temperature and compacted to form a relatively dense pavement layer. HMA is made by combining asphalt binder and aggregate in a mixing facility where they are heated, proportioned, and mixed. HMA facilities are classified as either a batch or drum-mix facilities. Batch hot mixing uses varying fractions of hot aggregate drawn in proportion to the amount of storage bins. The combination of the aggregates is dumped into a mixing chamber. The asphalt binder is then thoroughly mixed with the aggregate. After mixing, the material is emptied into trucks or storage. For drum-mixing, the aggregate and asphalt binder are heated and blended in the drum mixer at the same time.

HMA made with Bone Glue modified asphalt binder can be mixed and compacted at lower temperatures consuming less energy than traditional polymer modified asphalt mixtures.

In one embodiment, an asphalt composition comprises asphalt binder and an animal protein-based glue. In one embodiment, the animal protein based glue comprises collagen from animal bone waste. In another embodiment, the animal protein-based glue comprises collagen from animal skin or hide. In yet another embodiment, the animal protein-based glue comprises collagen from animal bones and skin or hide.

In another embodiment, the asphalt binder comprises an unmodified binder. Suitable binders include but are not limited to AC 5 (PG58-22). In another embodiment, the asphalt binder comprises a polymer modified binder. Suitable asphalt binders include but are not limited to PAC 30 (PG70-22). Alternatively, the asphalt binder comprises any compound capable of being modified and used as an asphalt binder in the production of asphalt.

In another embodiment, a method for creating HMA comprises combining at least one animal based protein glue modified asphalt binder and at least one aggregate. In one embodiment, the animal based protein glue is dissolved in a solvent before combining with an asphalt binder to form the modified binder. In one embodiment, the solvent is water. In one embodiment, the at least one modified asphalt binder and at least one aggregate are heated together in a drum and then mixed to form HMA. In another embodiment, the at least one aggregate is heated first and then the at least one modified binder is added to the at least one aggregate for mixing.

Example 1

Any asphalt binder can be modified with Bone Glue. In one embodiment AC 5 (PG58-22), a viscosity graded asphalt, is used as the binder and modified with 10% Bone Glue.

Bone Glue does not melt at high temperatures and instead burns and turns to ash. Bone Glue can be dissolved into a liquid in order to allow the Bone Glue to be mixed at higher temperatures with the asphalt binder. In the preferred embodiment, water is used as the solvent. Bone Glue dissolves in water at room temperature. However, if the water is heated, dissolution occurs more rapidly. This mixing process requires relative low energy and the Bone Glue itself is degradable as compared to other polymers. In one embodiment, a 10% modified AC 5 solution is mixed using 20 grams of Bone Glue pallets and 40 milliliters of water at room temperature in a pan. The dry weight of the pan, water, and Bone Glue are recorded. After 50 minutes, the pan and mixture are weighed again and then heated on a burner with continuous stirring for 10 minutes. When the water reaches its boiling point, the burner heat is reduced to avoid spillage. When the mixture becomes homogenous visually, the pan and solution are weighed again. Meanwhile, the asphalt binder is put in a preheated oven at 135° C. for one hour. The required amount of heated asphalt binder to create a 10% modified AC 5 solution is added to a 600 mL beaker, in this embodiment, 200 g, and then the Bone Glue-water solution is added to the beaker. The weights of beaker with the binder, solution, and spindle are recorded. The beaker is placed in an oil bath for mixing at 130° C. using a shear mixer at 1000 rpm. In order to allow the water to evaporate, the beaker remains uncovered during mixing. After 70 minutes of mixing, the weight of the beaker with the binder, solution, and spindle are recorded again. Using the recorded weights, the state of the evaporation is determined. When the mass loss equals the actual mass of the water added, the mixing time is considered adequate. The mixing time required for this embodiment is 60 minutes. Mixing times required for the other embodiments, i.e. 2.5%, 5%, 7.5%, and 20% modified AC 5 solutions, are recorded in FIG. 1.

In another embodiment, a viscosity graded asphalt, such as PAC 30 (PG70-22), is used as the binder and modified with Bone Glue. The mixing time sufficient to evaporate the water from the PAC30 binder is the same as the AC5 binder.

As used herein, "neat" means a binder preparation with no processing and no Bone Glue modification. "Control" means a binder preparation at the same processing conditions (mixing temperature and time) as Bone Glue modified binders, but the binder contains no Bone Glue. Control binders are prepared at mixing times of 40 minutes, 50 minutes, 60 minutes, and 70 minutes at 135° C., corresponding to mixing time and temperatures of 2.5%, 5%, 7.5%, 10% and 20% Bone Glue. Control binders are tested in order to determine improvement caused by Bone Glue only.

The HMA mixing and compaction process depends on the values determined through viscosity testing. The Brookfield rotational viscometer was used to determine viscosities of neat, control, and Bone Glue modified binders. The standard ASTM Method D4402 or AASHTO TP48 is adopted to determine the viscosity of neat and Bone Glue-modified binders. The viscosity readings are used to determine the mixing and compaction temperatures. Each AC5 binder is tested at 135° C., 150° C. and 165° C. and PAC30 binders are tested at 175° C. and 185° C. FIG. 2 is the viscosity comparison of AC5 neat and Bone Glue modified binders at (a) 135° C., (b) 150° C., (c) 165° C., and the (d) viscosity comparison of PAC30 neat and 10% Bone Glue modified binders. The data in FIG. 2(a) indicates that the percentage differences in viscosities between the control and Bone Glue modified binders are not significant (based on t-test having 95% confidence level). The increases in viscosity values due to Bone Glue modification are only due to short term aging caused during mixing process. The change in viscosity of 20% modified binder with respect to the control binder is only 10%. The viscosity results at 150° C. as shown in FIG. 2(b), exhibit significant differences in viscosity of neat and Bone Glue modified binders (based on t-test having 95% confidence level). Overall increases in viscosities due to modification are 40%, 50% and 70% for 7.5%, 10% and 20% Bone Glue modified binders, respectively. The significant increase in viscosity values at 10% and 20% Bone Glue modified binder were further observed at 165° C. as shown in FIG. 2(c). Such increases are 61% and 81%, respectively. However, 7.5% Bone Glue modified binder stayed consistent at a 40% increase as compared to neat binder. These increases were attributed to short-term aging during mixing and not due to Bone Glue modification.

The viscosity results of another embodiment, using PAC30 as abinder and PAC30 modified with 10% Bone Glue are shown in FIG. 2(d). The viscosity values of Bone Glue modified PAC30 are 13%, 15% and 19% higher than the PAC30 binders at 135° C., 165° C., and 185° C., respectively. Similar to the AC5 binders, these increases were attributed to short-term aging during mixing and not due to Bone Glue modification.

Furthermore, the mixing and compaction temperature ranges for all of the embodiments in this Example are displayed in FIG. 3. The average increase in mixing and compaction temperatures of 10% Bone Glue modified binder as compared to AC5 Neat is about 6° C. The average increases in mixing and compaction temperatures of PAC30 modified with 10% Bone Glue is around 2° C. These increases in mixing and compaction temperatures are not significant when compared to polymer modification. Polymer modification mixing and compaction temperature increases can be as high as 50° C. relative to neat binders. It is preferable to maintain lower mixing and compaction temperatures and therefore Bone Glue modified binders are actually preferable.

Rutting is a major problem in countries located on or near the equator because of the extreme temperatures. Thus Bohlin's Dynamic Shear Rheometer (DSR) is used to conduct frequency sweep tests on AC binder embodiments. The test procedure is similar to AASHTO TP5. The binders are sandwiched between lower fixed plate and an upper oscillation plate. Torque is applied and the deflection angle is measured. The gap between the two plates is maintained at 1 millimeter for higher temperature testing (>25° C.) and 2 millimeters for low temperature testing. The constant shear stress was such that the resulting strain remained within 10-12% for temperature testing of 25° C. or higher. For temperatures lower than 25° C. the shear stress corresponded to a shear strain of 2%. All tests were conducted at temperatures of 1° C., 8° C., 15° C., 25° C., 34° C., 46° C., 52° C., and 58° C. for a range of frequencies from 1 to 60 Hz at logarithmic increments.

The frequency sweep test was conducted to determine the complex shear modulus (G*) or total resistance to deformation when repeatedly sheared, and phase angle (δ), or the lag between the applied shear stress and resulting shear strain, of all the binders. G* and δ are used as predictors of HMA rutting and fatigue cracking. To resist rutting, an asphalt binder should be stiff and elastic. Thus the complex shear modulus elastic portion, $$\left(\frac{G^*}{\sin\delta}\right),$$

should be large.

The main advantage of frequency sweep tests at various temperatures is to develop the master curve for G* at reference temperatures using the time-temperature super positioning Horizontal shifting is performed by plotting the frequency and modulus data on a log-log scale and then shifting the resulting curves along the frequency (horizontal) axis by a constant factor, as shown in the following equation: $f_r = a(T) \times f$ where, $f_r$ is the shifted or reduced frequency to a reference temperature, f is the original frequency, and a(T) is the shift factor as a function of temperature.

G* is determined for each binder and $$\left(\frac{G^*}{\sin\delta}\right)$$

is calculated to incorporate the phase angle. The master curve of the AC5 binders is presented in FIG. 4 and illustrates that 10% Bone Glue modified binder exhibits significant improvement in $$\left(\frac{G^*}{\sin\delta}\right)$$

especially at low frequencies or high temperatures (34-58° C.). On the other hand, 2.5%, 5% and 7.5% Bone Glue modified binder show no significant increases in values as shown in FIG. 5. The 20% Bone Glue modified binder also exhibited improvement in $$\left(\frac{G^*}{\sin\delta}\right)$$

values but lower than 10% Bone Glue modified binder. This decline in $$\left(\frac{G^*}{\sin\delta}\right)$$

values illustrates that 10% Bone Glue content is the preferred embodiment.

The percentage improvements of AC5 with 10% Bone Glue modification for various frequency levels are reported in FIG. 6. The data indicates that 10% Bone Glue modified AC5 binder exhibits significant improvement at all frequencies, especially at lower frequencies relative to the control binders, e.g., the improvements are 164% and 85% at 0.0001 and 1.58 Hz, respectively. Because master curve data at low frequencies also reflects the behavior of material at high temperatures, it is expected that this improvement will enable the Bone Glue modified binder to resist rutting at high temperatures. The effect of short-term aging due to mixing is also observed in $$\left(\frac{G^*}{\sin\delta}\right)$$

values. The data in FIG. 6 reveals that the increases ranged from 16% to 76% from a frequency range of 1000-0.0001 Hz, respectively.

In another embodiment, PAC30 binders are also modified with 10% Bone Glue. FIG. 7 shows the master curves of PAC30 neat and PAC30 with 10% Bone Glue at 15° C. Results of the master curve show that percentage improvement in $$\left(\frac{G^*}{\sin\delta}\right)$$

of 10%

Bone Glue Modified binder is 20-27% from lower to higher frequencies, respectively. This improvement is substantially lower than the improvement shown by Bone Glue modification in AC5 binders. The reason is likely because the PAC30 binder is already modified with the SBS polymer. Nevertheless, a slight improvement in $$\left(\frac{G^*}{\sin\delta}\right)$$

coupled with the fact that mixing and compaction temperatures are not increased, is still a valuable improvement.

A Dynamic Shear Rheometer (DSR) is used to conduct dynamic shear fatigue test at 20° C. on the neat, control, and modified binders. The test set up and protocol is similar to AASHTO TP5 test procedure. Binder samples measuring 8 millimeters in diameter and 2 millimeters thick are sandwiched between the lower (fixed) and upper (oscillating) plates of the DSR and subjected to repeated sinusoidal oscillation under constant shear stress. The test is run at frequency of 10 Hz until complete failure of sample occurs. The initial and final stress levels are 100 Pa and 99.5 kPa, respectively. The stress level for each sample is determined for dynamic shear fatigue testing from an amplitude sweep test. G* and δ values were obtained for each cycle. G* values are then plotted against the number of cycles and fatigue life is determined as the number of cycles at which the G* reached 50% of its initial value.

Fatigue test results are shown in FIG. 8 and FIG. 9. The fatigue life increases with an increase in Bone Glue content and exhibits an optimum value at 10% Bone Glue content. The improvement in fatigue life of 10% Bone Glue modified AC5 binder is 3.5 times the AC5 neat asphalt binder. However, a portion of this improvement is due to the short-term aging during 70 min of mixing and processing.

The improvement in fatigue life of 10% Bone Glue modified binder relative to the control binder is 218%. It should be noted that the control binder exhibited a higher coefficient of variation in fatigue life as compared to the 10% Bone Glue modified binder. This variation might be attributed to the impact of the short-term aging during processing. The significant improvement in fatigue life corresponds directly to resistance to fatigue cracking in pavement.

In another embodiment, PAC30 modified with 10% Bone Glue is used. This embodiment also showed significant improvement in fatigue life as shown in FIG. 4. The results show an improvement of up to 107% indicating that polymer modified asphalt binders can be enhanced using Bone Glue without compromising the mixing and compaction temperatures.

DSR is also used to conduct creep compliance test. Creep is a slow, progressive deformation of a material under constant stress. Creep compliance is a measurement of the ratio of time dependent strain (ε(t)) to constant stress. The test was conducted at 15° C., 25° C. and 52° C. An 8 millimeter diameter and 2 millimeter thick sample is used for the test conducted at 15° C. and 25° C., and a 25 millimeter diameter and 1 millimeter thick sample is used for the test conducted at 52° C. AC5 neat, control, and 10% Bone Glue modified AC5 binders are used to conduct creep compliance test in stress-controlled mode. The stress levels are determined at corresponding temperatures by conducting amplitude sweep test at each temperature. A static shear load is applied for 90 seconds and after the load was released. The mixture is allowed to recover for 180 seconds. The creep compliance of the binder is calculated using the following equation:

$$D(t) = \frac{\varepsilon(t)}{\sigma_0}$$

where, ε(t) is time dependent strain and $\sigma_c$ is constant stress.

Creep causes a time dependent increase in length of the binder which could lead to failure in the pavement and is affected by changing temperatures. Because binders are subjected to varying temperatures during HMA processing, a lower creep compliance is preferred. The creep compliance results are shown in FIGS. 10-12. The figures demonstrate that the creep compliance of 10% GB modified binder is less than the neat and control binders. Percentage differences of 10% Bone Glue modified binder relative to the AC5 neat at 15° C., 25° C. and 52° C. at 90 s are 52%, 31%, 21%, respectively. A lower creep compliance indicates higher binder performance because of the material's ability to avoid rutting.

A Fourier Transform Infrared spectroscopy (FTIR) analysis is performed with Thermo Scientific Nicolet iS10 FTIR Spectrometer to observe if the mixing process is homogeneous and to measure the water content of the modified binder. IR spectroscopy involves collecting infrared radiation absorption information and analyzing it in the form of a spectrum. The frequencies at which there are absorptions of IR radiation can be correlated directly to bonds within the compound. Thus the IR spectrum of Bone Glue modified binders should ideally have the same peaks as non-Bone Glue modified binders.

The IR spectrum also demonstrates the presence of water and signals whether a longer reaction and evaporation time is warranted to remove any excess water from the modified binder.

The results are shown in FIGS. 13-16. IR peaks at 2850-2960 cm$^{-1}$ can be attributed to the C—H symmetric and asymmetric stretch. The IR peaks at 1465 and 1375 cm$^{-1}$ are characteristic for C—H bending vibrations (scissoring) while the peaks at 1150-1350 cm$^{-1}$ most likely are due to C—H bending vibrations such as twisting and wagging. The peaks at 720-740 cm$^{-1}$ are indicative of a C—H rocking vibrational mode.

Increasing the Bone Glue content of the solution presents these same characteristic C—H vibrational modes of the asphalt composite in the IR spectrum. However, an increase in Bone Glue content also increases the water content of the modified binder and this becomes observable in the IR spectrum. In particular, at the 10% level of Bone Glue in the AC 5 sample and at 20% Bone Glue, the O—H stretching frequency of water in the IR spectrum is observed at 3200-3400 cm$^{-1}$, 2100 cm$^{-1}$, and at 1640 cm$^{-1}$. All other observable peaks in the IR spectrum appear to be unchanged.

FIG. 16 shows the PAC 30 results. 10% Bone Glue modified PAC 30 exhibits an identical spectroscopy to neat PAC 30. This means that mixing procedure is homogenous and no traces of solvent were found in spectroscopy. This spectroscopy also substantiates the viscosity results and the mixing procedure.

Example 2

As stated above, Bone Glue modification is not binder specific, and can be employed with multiple different binders in one or more embodiments. In one embodiment, AC5 is used as the binder. In another embodiment, PAC30 is used as the binder.

The HMA mixing and compaction process depends on the values determined through viscosity testing. The viscosity readings are used to determine the improvement in PG grading and overall mixing and compaction temperatures.

The Brookfield rotational viscometer is again used and the standard ASTM method D4402 or AASHTO TP48 is adopted to determine the viscosity of neat and Bone Glue-modified AC5. The AC5 binder is tested at 135° C., 150° C., and 165° C. and at 0%, 2.5%, 5%, 7.5%, 10%, and 20% Bone Glue. FIG. 17 demonstrates that the viscosity of the Bone Glue-modified AC5 binder does not change significantly at 135° C. FIG. 18 demonstrates that the viscosity of another embodiment, Bone Glue-modified PAC30, also does not change significantly at 135° C.

Furthermore, the mixing temperature ranges of HMA mixtures for AC5 neat and 10% Bone Glue modified are 143° C. to 147° C. and 148 to 158° C. respectively. Similarly, the compaction temperature ranges for AC5 neat and 10% Bone Glue-modified are 135° C. to 140° C. and 139° C. to 144° C., respectively. The average difference in mixing temperature is about 8° C. and the average difference in compaction temperature is 4° C. These reductions in temperature results in emissions reductions and a decrease in energy consumption in the HMA process.

Rutting is a major problem in countries located on or near the equator because of the extreme temperatures. Bohlin's dynamic shear rheometer (DSR) is used to conduct frequency sweep tests on AC5 neat and Bone Glue-modified AC5 at temperatures of 1° C., 8° C., 15° C., 25° C., 34° C., 46° C., 52° C., and 58° C. within the viscoelastic stress and strain levels for a range of frequencies from 1 to 60 Hz at logarithmic increments. The frequency sweep determines the complex shear modulus elastic portion of the binder or $$\left(\frac{G^*}{\sin\delta}\right).$$

The complex shear modulus increases with an increased percentage of Bone Glue in the solution. The preferred embodiment is a 10% Bone Glue solution. The improvements in rutting parameter imply high resistance to permanent deformation or rutting. Similar results were determined in other embodiments using PAC30 as the binder. FIG. 19 compares $$\left(\frac{G^*}{\sin\delta}\right)$$

for varying embodiments. G* and δ are used as predictors of HMA rutting and fatigue cracking. To resist rutting, an asphalt binder should be stiff and elastic. Thus $$\left(\frac{G^*}{\sin\delta}\right)$$

should be large. The table indicates that the preferred embodiment contains 10% Bone Glue because of the peak in the complex shear modulus.

FTIR analysis is again performed with a Thermo Scientific Nicolet iS10 FT-IR spectrometer in order to observe if the mixing process was homogeneous. FIG. 20 is the IR spectroscopy of neat and modified AC5. Water can be damaging to binders and thus the FITR is also use to determine the water content of the mixture. IR peaks at 2850-2960 cm$^{-1}$ can be attributed to the C—H symmetric and asymmetric stretch. The IR peaks at 1465 and 1375 cm$^{-1}$ are characteristic of C—H bending vibrations (scissoring) while the peaks at 1150-1350 cm$^{-1}$ most likely are due to C—H bending vibrations such as twisting and wagging. The peaks at 720-740 cm$^{-1}$ are indicative of a C—H rocking vibrational mode. These same characteristic C—H vibrational modes of the asphalt composite are still present in the IR spectrum with increasing Bone Glue concentrations. However, the amount of water in the solution also increases and this becomes observable in the IR spectrum. In particular, at a 10% and 20% Bone Glue concentration, the O—H stretching frequency of water in the IR spectrum is observed at 3200-3400 cm$^{-1}$, 2100 cm$^{-1}$, and 1640 cm$^{-1}$. All other observable peaks in the IR spectrum appear to be unchanged.

For the purpose of understanding the Bone Glue Modified Asphalt, references are made in the text to exemplary embodiments of a Bone Glue Modified Asphalt, only some of which are described herein. It should be understood that no limitations on the scope of the invention are intended by describing these exemplary embodiments. One of ordinary skill in the art will readily appreciate that alternate but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change to the basic function to which it is related.

The invention claimed is:

1. A modified asphalt composition comprising:
   (a) an asphalt binder;
   (b) a predetermined concentration of animal protein-based glue wherein said predetermined concentration of animal protein-based glue is greater than or equal to 5% and less than 20%; and
   (c) an aggregate, wherein the predetermined concentration of animal protein-based glue is dissolved in water, and wherein the asphalt binder and animal protein-based glue dissolved in water are applied to the aggregate.

2. The modified asphalt composition in claim 1, wherein said animal protein-based glue comprises collagen from animal bones.

3. The modified asphalt composition in claim 2, wherein said animal bones are from a group comprising cows, pigs, calf, and sheep.

4. The modified asphalt composition in claim 1, wherein said animal protein-based glue comprises collagen from animal hides.

5. The modified asphalt composition in claim 1, wherein said asphalt binder is not previously polymer modified.

6. The modified asphalt composition in claim 1, wherein said asphalt binder is previously polymer modified.

7. The modified asphalt composition in claim 1, wherein said asphalt binder is selected from a group comprising, AC 5 (PG58-22) and PAC 30 (PG70-22).

8. A method for making Hot Mix Asphalt comprising:
   (a) dissolving an animal protein-based glue in water;
   (b) combining the animal protein-based glue and water mixture with an asphalt binder, wherein the concentration of said animal protein-based glue is greater than or equal to 5% and less than 20%;
   (c) applying heat to an aggregate; and
   (d) combining the asphalt binder and aggregate.

9. The method of claim 8, wherein said heat is applied to an aggregate and asphalt binder simultaneously.

10. The method of claim 8, wherein said animal protein-based glue comprises collagen from animal bones.

11. The method of claim 8, wherein said animal protein-based glue comprises collagen from animal hides.

12. The method of claim 8, wherein said asphalt binder is not previously polymer modified.

13. The method of claim 8, wherein said asphalt binder is previously polymer modified.

14. The method of claim 8, wherein said binder is selected from a group comprising AC 5 (PG58-22) and PAC 30 (PG70-22).

* * * * *